United States Patent [19]
Schneider

[11] Patent Number: 5,480,539
[45] Date of Patent: Jan. 2, 1996

[54] ARRANGEMENT FOR REDUCING THE MOISTURE CONTENT OF SLUDGE

[75] Inventor: Heiko Schneider, Oberderdingen, Germany

[73] Assignee: Langbein & Engelbracht GmbH & Co. KG, Bochum, Germany

[21] Appl. No.: 290,035

[22] Filed: Aug. 12, 1994

[30] Foreign Application Priority Data

Aug. 14, 1993 [DE] Germany ............................ 9312198 U

[51] Int. Cl.⁶ .................................................. B01D 1/18
[52] U.S. Cl. ........................ 210/177; 210/180; 210/181; 210/188; 210/258; 210/260; 159/4.01; 34/373
[58] Field of Search ..................................... 210/179, 180, 210/181, 182, 188, 258, 260, 769, 771, 177; 159/4.01, 48.1; 34/372, 373, 374

[56] References Cited

U.S. PATENT DOCUMENTS

| | | | |
|---|---|---|---|
| 3,909,410 | 9/1975 | Neukamm | 210/179 |
| 4,145,278 | 3/1979 | Davy | 210/711 |
| 4,193,206 | 3/1980 | Maffet | 210/769 |
| 5,037,561 | 8/1991 | Copeland | 210/769 |
| 5,069,801 | 12/1991 | Girovich | 210/771 |
| 5,215,262 | 6/1993 | Binder | 241/19 |
| 5,223,088 | 6/1993 | Hansen | 34/372 |
| 5,245,120 | 9/1993 | Srinivasachar et al. | 588/256 |
| 5,259,977 | 11/1993 | Girovich et al. | 210/181 |
| 5,339,621 | 8/1994 | Tolman | 210/769 |

FOREIGN PATENT DOCUMENTS 0571684  12/1993  European Pat. Off. ............. 159/4.01

OTHER PUBLICATIONS

Martin, Alison M; Nolan, Sharon L.; Gess, Paula S.; Benson, Todd A., "Control Odors from CPI Facilities," Chemical Engineering Progress, Dec. 1992, pp. 53–61.

Primary Examiner—Peter A. Hruskoci
Assistant Examiner—Theodore M. Green
Attorney, Agent, or Firm—Friedrich Kueffner

[57] ABSTRACT

An arrangement for reducing the moisture content of sludge includes a spray dryer to which the sludge, a dispersion medium in the form of gas or vapor as well as hot gas can be supplied. The arrangement further includes a separating unit with solids discharge arranged following the spray dryer via a transfer line and a heater for raising the temperature level of the gas entering the separating unit, wherein the heater is arranged in a connecting line between the separating unit and the spray dryer.

10 Claims, 2 Drawing Sheets

ARRANGEMENT FOR REDUCING THE MOISTURE CONTENT OF SLUDGE

BACKGROUND OF THE INVENTION

1. Field of the Invention

The present invention relates to an arrangement for reducing the moisture content of sludge.

2. Description of the Related Art

Sludge in the form of biological sludge is produced, inter alia, in the biological clarification of industrial waste waters, for example, the waste waters of a de-inking flotation plant. In the past, the biological sludge was usually considered a waste product and, therefore, was not utilized further. The sludge was deposited in dumps. However, since biological sludge has a very low dry substance content, it is very difficult to deposit the sludge and, therefore, the sludge has o be frequently mixed with other wastes having higher solids contents in order to be able to deposit the sludge in dumps. In addition to depositing the sludge in dumps, there is the transportation of the biological sludge to the dump which was always relatively expensive and cumbersome. It additionally significantly added to street traffic. Also, the dumping costs were extremely high, especially because less and less suitable dumping space can be made available. Moreover, the regulations concerning environmental protection with respect to the capability of dumping wastes become more stringent, so that the costs in this respect are also significantly increased.

Substantially the same problems occur in the case of industrial sludges in the form of, for example, oil sludge or solvent-containing sludges. In the case of these types of sludges, there is the additional disadvantage that they cannot be deposited in normal dumps, but must be brought to special dumps.

SUMMARY OF THE INVENTION

Therefore, it is the primary object of the present invention to further develop an arrangement of the above-described type in such a way that not only the portion of sludge to be dumped is significantly reduced, but also that the entire sludge or individual fractions of the sludge can be utilized further.

In accordance with the present invention, the arrangement for reducing the moisture content of sludge includes a spray dryer to which the sludge, a dispersion medium in the form of gas or vapor as well as hot gas can be supplied. The arrangement further includes a separating unit with solids discharge arranged following the spray dryer via a transfer line and a heater for raising the temperature level of the gas entering the separating unit, wherein the heater is arranged in a connecting line between the separating unit and the spray dryer.

The arrangement according to the present invention makes it possible to convert the sludge into a solid product having a high dry substance content. This dry substance content is achieved in accordance with the present invention by finely distributing the sludge in the spray dryer with the aid of compressed air or vapor as dispersion medium, so that a very large surface area is achieved. Since the dispersion takes place into the hot gas stream, this large surface area results in a very quick thermal drying. The cooled hot gas is conducted as waste gas into the separating unit, wherein the waste gas is conducted through and heated by a heater and is subsequently again conducted to the spray dryer. This manner of circulation prevents an unnecessary entry of oxygen or causes the $O_2$ concentration to be lowered.

The solid product separated in the separating unit is conducted through a discharge arranged following the separating unit. In particular, the product is transported away continuously. The thermal drying of the sludge in accordance with the present invention provides the advantage that only an infinitely small amount of sludge in the form of a solid product is produced which then requires a significantly reduced dumping space. In addition, the transportation costs for such a solid product are significantly reduced, not only because of the smaller quantity, but also because of its dry properties. In addition, if the solid product obtained particularly from biological sludges has the appropriate composition, preferably chemicals used in the prior processes, such as, water glass, potassium soap, fatty acids, sodium peroxide, etc., the resulting high-grade solid product can be utilized further, for example, in recultivation in landscaping and gardening as carrier medium for water in soils which are poor in nutrition. Furthermore, it is possible to utilize the solid product as a basic material for the production of organic fertilizer or the solid product can be burned. Solid products obtained, for example, from oil sludges can now be utilized with particular advantage in connection with supplemental additives, possibly in connection with an aftertreatment, as materials for road construction. The sludge is supplied to the spray dryer through a supply line into which a pump, particularly a spiral pump, is integrated. The pump receives the sludge obtained, for example, from a centrifuge or from a screen belt press or resulting directly from the production process, and conveys the sludge into the upper portion of the spray dryer where the sludge is finely dispersed into the hot gas flow with the dispersion agent in the form of gas or vapor. At the lower end of the spray dryer, an essentially dry solid product having a low residual moisture is obtained. Together with the gas flow composed of the cooled hot air, the compressed air or the vapor, and the moisture evaporated from the sludge, for example, water or other solvents, the solid product is conducted to the separating unit in which the separation of the solid product from the gaseous contents takes place.

In accordance with an advantageous feature of the present invention, a two-component nozzle is used in the spray dryer, wherein the sludge and the dispersion medium (compressed air or vapor) are supplied to the two-component nozzles. The spray dryer is constructed as a cylindrical container having conical end portions. The two-component nozzle is mounted at the upper end of the cylindrical container. The hot gas entering the spray dryer at the upper end is distributed uniformly above the two-component nozzle and the hot gas acts on the gas/solids mixture which is discharged from the two-component nozzle. Since the solids are finely distributed in this mixture, the solids have a high specific surface area which ensures an extremely intensive heat exchange with the hot gas and, consequently, results in a high degree of drying.

In accordance with another feature, the heater arranged between the separating unit and the upper end of the spray dryer may be an externally heated heat exchanger. In principle, it is of no significance as to how the heat exchanger is heated. Instead of an externally heated heat exchanger, it is also possible to provide a directly fired combustion chamber as heater.

In order to ensure a better transportation of the gas flow emerging from the separating unit over and past the heater toward the spray dryer, another feature of the present invention provides that a blower is arranged between the separating unit and the heater.

In accordance with another useful feature, the solids discharge is formed by a cellular wheel sluice. The cellular wheel sluice is arranged at the lower end of the separating unit. However, if products are being processed which have the tendency to cake on, it is possible to provide instead of the cellular wheel sluice an appropriately-constructed discharge device, such as, a double pendulum flap.

Since the system is set up in such a way that the solid product is in the form of dust, but the product is frequently not desired in this form for further processing, another feature of the present invention provides that a device for granulating the solid product is arranged following the solids discharge. It is additionally possible to admix additional materials, such as, potassium and magnesium, during the granulation. This produces a granulate which is preferably suitable as a fertilizer. The device for granulating the solid product may be followed by a conveying screw which conveys the granulate to a filling unit.

In accordance with a further feature of the present invention, a junction leading to a fuel-fired combustion chamber is connected to the line between the separating unit and heater, wherein the waste gases of the combustion chamber are initially conducted through the heater and then into the atmosphere. Thus, a small portion of the gas flow emerging from the separating unit is branched off in front of the heater and conducted to the combustion chamber as combustion air. The combustion chamber is fired with fermentation gas, methane, natural gas, etc. In this manner, organic components of the gas flow are burned, so that the waste gases conducted through the heat exchanger into the atmosphere do not contaminate the environment or at least do not contaminate it significantly. In particular, the combustion eliminates odorous components of the gas flow. In accordance with another feature, a junction leading to a washer is connected to the line between the separating unit and the heater, wherein a biofilter connected to the atmosphere is arranged following the washer. Thus, also in this case, a portion of the gas flow emerging from the separating unit is branched off. However, in this case, the portion of the gas flow is supplied to a washer. In the washer, the gas flow is cooled from approximately 100° C. to 40° C. and is moistened in the process. The moistening has the result that, in a subsequently arranged biofilter, a problem-free conversion of the odorous components of the gas flow can be carried out. Only purified waste air then emerges into the atmosphere from the biofilter.

If the arrangement is used to process oil sludges or solvent-containing sludges from industrial processes, another feature of the present invention provides that a junction leading to a condensation unit is connected to the line between the separating unit and the heater, wherein the condensation unit is provided with discharge devices for various fractions which are separated in accordance with temperature. The condensation unit includes a special heat exchanger surface to which a cooling medium, particularly cooling water, is admitted in such a way that individual fractions can be removed from the condensation device in the form of liquid and depending on temperature and can be conveyed to further processing. The fractions can also be conducted directly into the production process.

It is additionally possible to connect a heavy metal collector following the condensation unit. However, such a heavy metal collector can also be arranged in front of the condensation unit.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
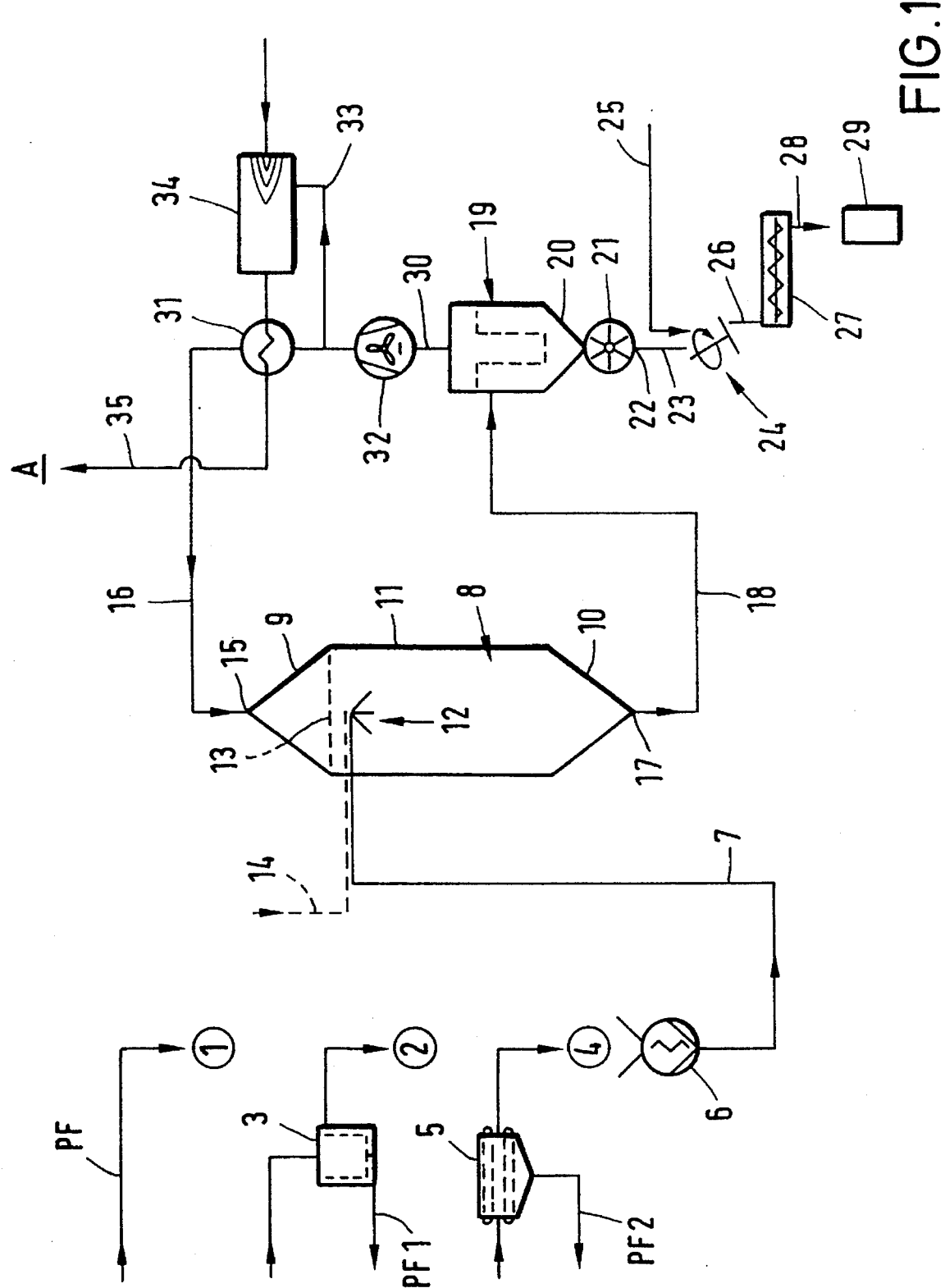
FIG. 1 is a schematic diagram of an arrangement for reducing the moisture content of biological sludge.
Figure 2:
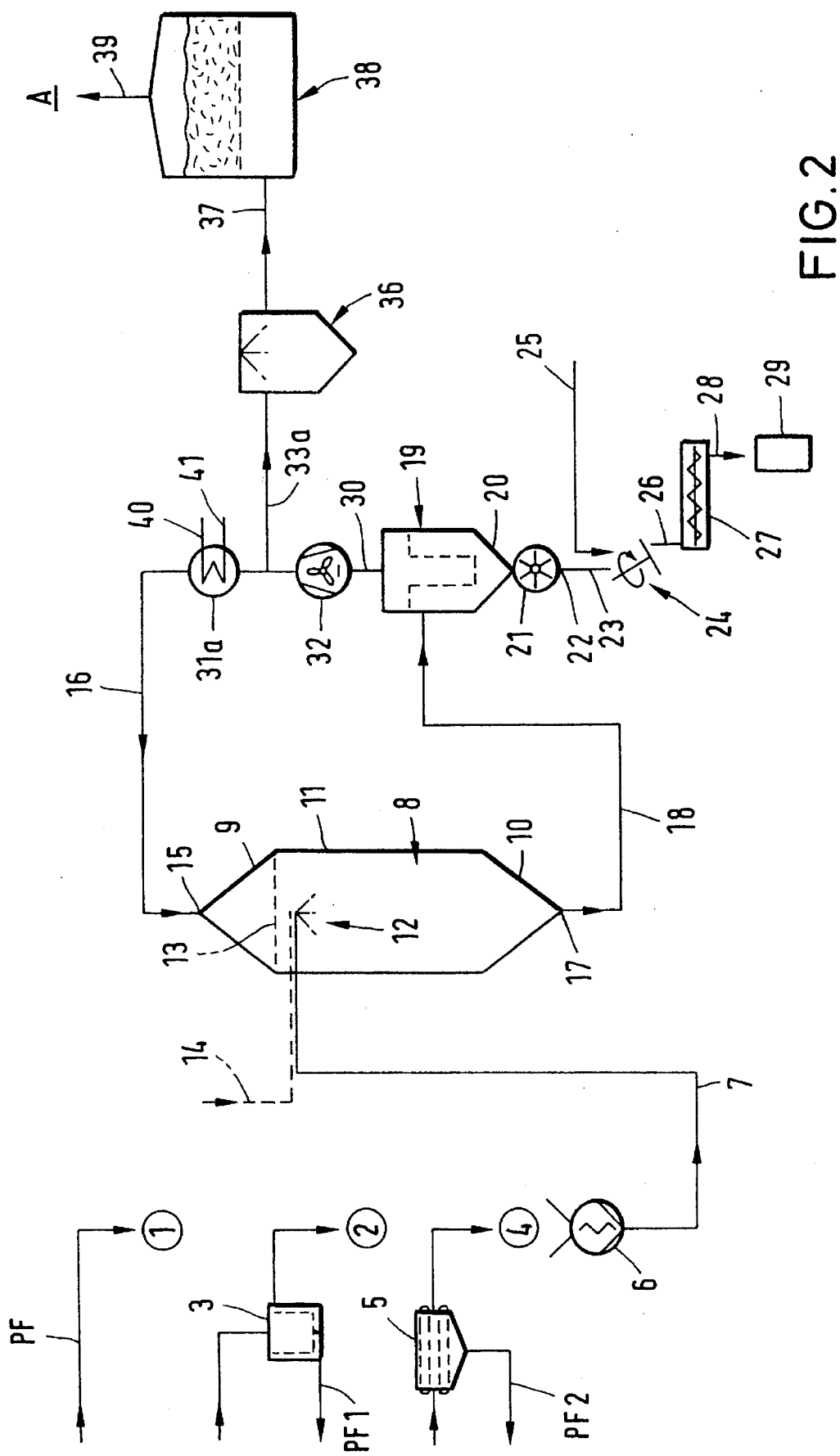
FIG. 2 is a schematic diagram of another embodiment of the arrangement for reducing the moisture content of biological sludge.

As illustrated in FIGS. 1 and 2 of the drawing, biological sludge in the form of foam may be conducted to the arrangement at 1 as indicated by arrow PF.

However, the biological sludge may also enter at 2 at the outlet of a centrifuge 3. The clear water from the centrifuge 3 is conducted away as indicated by arrow PF1.

Finally, biological sludge may enter at 4 at the outlet from a screen belt press 5. In this case, the clear water is conducted away in accordance with arrow PF2.

The biological sludge collected at 1, 2 or 4 is conducted to a spiral pump 6 which causes the biological sludge to be conducted through a supply line 7 into a spray dryer 8. The spray dryer 8 is an essentially cylindrical container 11 with conical end portions 9, 10. The supply line 7 ends concentrically in the container 11 in a two-component nozzle 12. The two-component nozzle 12 is located slightly below a distribution plane 13 at the transition from the container 11 to the upper conical end portion 9. In addition, compressed air or vapor is supplied to the two-component nozzle 12 through a line 14. A line 16 for conducting hot gas to the spray dryer 8 is connected to the upper end 15 of the upper conical end portion 9.

A transfer line 18 is connected to the bottom point 17 of the lower conical end portion 10 of the spray dryer 8. The transfer line 18 is connected to a separating unit 19 in the form of a filter.

The separating unit 19 has at the lower conical end 20 thereof a cellular wheel sluice 21 whose discharge 22 is connected through a line 23 to a device 24 for granulating an essentially dust-like solid product. A line 25 additionally is connected to the device 24 for granulating the product. For example, potassium or magnesium can be admixed to the device 24 through the line 25.

The granulating device 24 is connected through a line 26 to a screw conveyor 27 which, in turn, is coupled through a line 28 to a filling unit 29.

Connected to the upper end of the separating unit 19 is a gas line 30 which extends to a heat exchanger 31, 31a. A blower 32 is integrated into the gas line 30. The line 16 connected to the upper conical end portion 9 of the spray dryer 8 is connected to the other end of the heat exchanger 31, 31a. A junction 33, 33a is arranged in the gas line 32 between the blower 30 and the heat exchanger 31, 31a.

In the embodiment of FIG. 1, the junction 33 leads to a combustion chamber 34 which is supplied with a fuel, such as a fermentation gas, methane or natural gas. The hot waste gas from the combustion chamber 34 is conducted through the heat exchanger 31 and from the heat exchanger 31 through a line 35 into the atmosphere A.

In the embodiment of FIG. 2, the junction 33*a* leads to a washer 36. The washer 36 is connected through a line 37 to a bio filter 38. A waste air line 39 leading to the atmosphere A is connected to the upper end of the biofilter 38.

The heat exchanger 31*a* is externally fired. The connections are indicated by 40 and 41.

The biological sludge finely dispersed by means of compressed air or vapor by the two-component nozzle 12 has a solids content with a large surface area. Consequently, the hot gas introduced in the upper conical end portion 9 of the spray dryer 8 can carry out a quick and intensive thermal drying of the dry substance.

The solid product dried in this manner is then conveyed by the air flow through the transfer line 18 to the separating unit 19. In the separating unit 19, the solid product is separated from the gas flow. The solid product is discharged through the cellular wheel sluice 21 and is supplied, possibly with prior granulation, to the filling unit 29. The gas flow purified in the separating unit 19 is conducted by means of the blower 32 to the heat exchanger 31, 31*a*, is heated in the heat exchanger 31, 31*a* and is then conducted as hot gas into the spray dryer 8.

In the embodiment of FIG. 1, a small partial flow of the gas from which dust has been removed is conducted through the junction 33 into the combustion chamber 34 where it serves as combustion air for the firing process. The waste gas purified by the combustion is then conducted through the line 35 into the atmosphere A.

In the embodiment of FIG. 2, a small partial flow is branched off at the junction 33*a*. The partial flow is cooled in the washer 36, is neutralized and conducted to the biofilter 38, where it is deodorized and then conducted into the atmosphere A.

The invention is not limited by the embodiments described above which are presented as examples only but can be modified in various ways within the scope of protection defined by the appended patent claims.

I claim:

1. An arrangement for reducing the moisture content of sludge, the arrangement comprising a spray dryer, a separating unit connected downstream of the spray dryer via a transfer line, the separating unit comprising a solids discharge, further comprising a heater for heating gas obtained in the separating unit to a higher temperature level, the heater being connected in a connecting line between the separating unit and the spray dryer, wherein the spray dryer comprises a cylindrical container having upper and lower ends, and conical end portions connected to the upper and lower ends of the cylindrical container, further comprising a two-component nozzle in the cylindrical container at the upper end thereof, means for supplying the sludge to the two-component nozzle and means for supplying a dispersion medium in the form of gas or vapor to the two-component nozzle, a distributor mounted above the two-component nozzle, and means for supplying hot gas to the distributor.

2. The arrangement according to claim 1, wherein the heater comprises an externally heated heat exchanger.

3. The arrangement according to claim 1, comprising a blower connected between the separating unit and the heater.

4. The arrangement according to claim 1, wherein the solids discharge comprises a cellular wheel sluice.

5. The arrangement according to claim 1, comprising a device for granulating solid product connected downstream of the solids discharge.

6. The arrangement according to claim 1, comprising a junction connected in the connecting line between the separating unit and the heater, a fuel-fired combustion chamber being connected to the junction, further comprising means for conducting waste gases from the combustion chamber through the heater and subsequently into atmosphere.

7. The arrangement according to claim 1, comprising a junction connected in the connecting line between the separating unit and the heater, and a biofilter connected to atmosphere being connected downstream of the washer.

8. The arrangement according to claim 1 comprising a junction connected in the connecting line between the separating unit and the heater, a condensation device being connected to the junction, means for supplying a cooling medium to the condensation device, the condensation device comprising discharge units for fractions separated individually in dependence on temperature.

9. The arrangement according to claim 8, comprising a heavy metal collector connected upstream of the condensation device.

10. The arrangement according to claim 8, comprising a heavy metal collector connected downstream of the condensation device.

* * * * *